United States Patent Office 3,257,164
Patented June 21, 1966

3,257,164
RECOVERY OF VANADIUM
James L. Drobnick and Clifford J. Lewis, Lakewood, Colo., assignors to Pennsalt Chemicals Corporation, Philadelphia, Pa., a corporation of Pennsylvania
No Drawing. Filed July 21, 1961, Ser. No. 125,642
7 Claims. (Cl. 23—22)

This invention deals with improving the process by which vanadium values contained in aqueous solutions are removed and recovered by liquid ion exchange. More particularly, the invention relates to an improvement in the process of recovering vanadium from alkaline leach liquors.

The process of liquid-liquid extraction (often called solvent extraction or liquid-ion exchange) is well known in the art and has been applied to the extraction of uranium for some time. In operation, the process involves an intimate mixture of a water-immiscible organic phase with a uranium-pregnant sulfuric acid leach solution whereby the uranium, together with some impurities, enters the organic phase. The two phases are separated and the uranium-loaded organic phase is then mixed with an aqueous stripping solution which removes the uranium. The organic solvent solution (a long chain alcohol diluted with kerosene) contains an additive such as an amine or amine derivative (e.g. a long chain quaternary ammonium halide) to enhance the transfer of the uranium from the acid leach solution to the organic phase. A more complete description of this extraction process is given in the article "Solvent Extraction in the Mining Industry," by C. J. Lewis and J. L. Drobnick, which article appeared in Industrial and Engineering Chemistry, vol. 50, page 53A, December 1958.

In uranium processing, alkaline vanadium-pregnant solutions are obtained from a water quench of a roasted yellow cake of sodium diuranate which is high in vanadium content This yellow cake is recovered from uranium plants using the alkaline carbonate leaching system and vanadium impurities build up in these solutions during leaching and accumulate in the yellow cake. Frequently, this vanadium must be removed before marketing the yellow cake and removal is accomplished by roasting the cake and quenching it with water, the vanadium going into the aqueous phase. There has been much interest in the industry in the solvent extraction of vanadium from such aqueous residues.

In investigating this possibility, however, it has been found that impurities in the leach liquor frequently cause emulsification of the aqueous and organic phases and prevent the formation of two immisible layers conducive to separation. It has been found that the impurity most responsible for this emulsification phenomenon is silica, most probably in colloidal solution. While the removal of silica by flocculation with inorganic salts (e.g. zinc salts, etc.) is known in the art, the use of such salts alone does not serve to eliminate the emulsification problem which occurs with the vanadium pregnant solutions obtained from the uranium extraction.

It has now been found in accord with this invention that the adverse effects of colloidal silica on solutions containing vanadium values can be overcome by the sequential steps of (1) adjusting the pH of the solution to a pH value between about 8 and about 9.5, (2) aging the solution for at least about eight hours, and (3) reducing the silica content to less than about 1.6 grams of $SiO_2$ per liter of solution by adding a flocculant selected from the class of water soluble metal sulfates.

As indicated, the first step of the process of this invention is the adjustment of the vanadium-pregnant solution to a pH between about 8 and about 9.5. This is preferably and readily done simply by passing $CO_2$ gas into the solution until the desired pH level is reached. Alternatively, alkali metal bicarbonates (e.g. $NaHCO_3$) can be used for the pH adjustment, but in order to avoid the introduction of metal ions it is preferred to use gaseous $CO_2$.

It is necessary that this pH range be maintained for optimum recovery of vanadium, for if the process is operated above or below this pH range the recovery of vanadium in subsequent operations is materially lessened. Preferably, a pH range of 8.8 to 9.2 will be used.

Aging of the solution after pH adjustment is carried out simply by letting the solution stand at ambient temperature for the required time. Normally this will require at least about eight hours, but it is preferred to use about 16 to 24 hours. Heating will accelerate the aging somewhat, but it is neither necessary nor economical. In the absence of the aging period, however, sufficient silica is not removed to prevent emulsion formation during the subsequent liquid extraction operation.

As pointed out above, the metal sulfate flocculant is added after the aging step and is added in an amount to reduce the silica content to a value less than about 1.6 grams of $SiO_2$ per liter of solution. Surprisingly, there is no need to remove all of the silica. Preferably the metal sulfate used as flocculant will be a polyvalent metal sulfate (e.g. $M_2(SO_4)_x$, where M is a metal ion and $x$ is its valence and is a digit greater than one). The preferred flocculant is zinc sulfate, but aluminum sulfate and magnesium sulfate are also most useful. Operable also are copper sulfate, ferrous sulfate, and the like. Other known flocculants which are not sulfates (e.g. $FeCl_3$) are operable in this invention, but should be avoided because the anion (e.g. $Cl^-$) may interfere with the liquid ion exchange procedure and significantly lower extraction efficiency. It will be understood that hydrated sulfate salts as well as anhydrous salts may be used. The flocculant is added with mild mechanical agitation and then the solution is allowed to stand under quiescent conditions for about 20 to 60 minutes prior to filtration of the silica flocculant. To expedite the filtering operation, a diatomaceous earth coating may be placed on the filter in accord with usual practice. Alternatively, the silica floc may be removed by centrifugation.

As indicated the amount of flocculant added will be that required to reduce the silica to less than about 1.6 grams of $SiO_2$ per liter of solution. This amount is readily determined empirically on a sample of the solution using analytical techniques to obtain the silica content. For the preferred flocculant, $ZnSO_4$, the amount added will be between about 0.15 and about 0.2 pound of $ZnSO_4$ per pound of $SiO_2$ in the solution. Unless the flocculant added reduces the silica content of the solution to about 1.6 grams per liter or less the liquid ion exchange extraction process for the vanadium is inoperable due to emulsion formation.

After the vanadium-pregnant alkaline leach liquor has been treated by the above described steps the vanadium values contained may be extracted by conventional liquid-liquid extraction techniques without emulsification difficulties. It has been found, however, that a preferred procedure for the extraction involves use of a solvent comprised of isodecanol, kerosene as a diluent, and a quaternized tertiary amine. As a stripping solution an aqueous solution comprised of ammonium chloride and ammonia preferably is used, but other stripping systems such as NaOH and $Na_2SO_4$, NaCl and NaOH, or NaCl alone are operable and can be employed.

The liquid-liquid extraction system is conventional and is similar or identical to the Amex processes as described in the article authored by Coleman, Brown, Moore, and Crouse appearing in Industrial and Engineering Chemistry, vol. 50, pages 1756–62 (1958). A typical continuous extraction process using a mixer-settler is also disclosed in the Lewis and Drobnick article referred to above.

In order to more fully illustrate the invention the following example is given:

*Example*

Carbon dioxide gas was passed into an alkaline vanadium-pregnant liquor containing 3.5 grams per liter of $SiO_2$ obtained from an alkaline uranium mill at Grants, New Mexico, until the pH decreased to 9.0. The solution was then aged for twenty-four hours and $ZnSO_4 \cdot 7H_2O$ in an amount of 1 gram per liter of solution (i.e. 0.16 pound $ZnSO_4$ per pound of $SiO_2$ in solution) was added with slight agitation for several minutes and then the solution allowed to stand for 30 minutes. Flocculation of the silica occurred reducing the $SiO_2$ content to 1.57 g./l. which represents a 55% removal of the $SiO_2$ in the original liquor.

Analysis showed that the treated solution contained 41.2 grams per liter of $V_2O_5$ and this solution was used to feed a liquid-liquid extraction circuit consisting of four extraction stages and two strip stages. The aqueous phase in the strip circuit was fed into strip stage one and fed concurrently to strip stage two. A recycle stream of the aqueous phase leaving strip stage two was fed back to the mixer of strip stage two.

The solvent used was a 6 volume percent solution of isodecanol in kerosene and contained 9% by volume of tricaprylyl monomethyl ammonium chloride. The stripping solution was an aqueous ammonium chloride-ammonia solution. The solution used for the first twenty hours of operation contained 80 grams per liter of $NH_4Cl$ and 15 grams/liter of ammonia. The stripping solution used during the next twenty-seven hours of operation had the same ammonia content, but contained 200 grams per liter of $NH_4Cl$.

The extraction of vanadium proceeded in a very satisfactory manner, the percent extraction (as $V_2O_5$) increasing from 76.4% after one hour operation to over 99% after operation for forty-two hours.

On the other hand when the aging and $ZnSO_4$ treatment of the feed liquor were eliminated liquid-liquid extraction was impossible because of the emulsion which formed between the aqueous feed and the organic solvent.

Likewise when either the aging step or the $ZnSO_4$ is omitted, the extraction is unsuccessful due to emulsion formation.

However, replacement of the zinc sulfate in the above example with $MgSO_4 \cdot 7H_2O$ or $Al_2(SO_4)_3$ gives equivalent results in reducing the $SiO_2$ content and enabling satisfactory performance of the liquid ion exchange process.

It will be understood that numerous variations and changes in the above description and example may be made by the skilled art worker without departing from the spirit and scope of the invention.

We claim:
1. A process for preventing the formation of emulsions in the recovery of vanadium by liquid ion exchange of an alkaline solution containing vanadium and silica, which comprises adjusting said vanadium solution to a value between about pH 8 and about pH 9.5, aging said solution by allowing it to stand for at least about 8 hours, subsequently reducing the silica content to less than about 1.6 grams of $SiO_2$ per liter of solution by adding with agitation a water soluble polyvalent metal sulfate selected from the group consisting of zinc, aluminum, magnesium, copper, and iron sulfates, allowing the solution to stand in the quiescent condition to flocculate the silica, separating the silica floc, whereby the alkaline vanadium containing solution is subsequently processed for vanadium recovery by liquid ion exchange without the formation of emulsions.

2. The process of claim 1 wherein the pH adjustment is made with carbon dioxide gas.

3. A process for the liquid ion exchange of vanadium values from an alkaline vanadium leach liquor containing colloidal silica which comprises adjusting said vanadium leach liquor to a pH between pH 8.8 and pH 9.2, aging said leach liquor by allowing it to stand for 16 to 20 hours, subsequently reducing the silica content to less than about 1.6 grams of $SiO_2$ per liter of leach liquor by adding with agitation a water soluble polyvalent metal sulfate selected from the group consisting of zinc, aluminum, magnesium, copper, and iron sulfates, allowing the solution to stand under quiescent conditions, filtering the silica floc which forms, and thereafter extracting vanadium by liquid ion exchange.

4. The process of claim 3 in which the pH adjustment is made with carbon dioxide gas.

5. The process of claim 3 in which the flocculant is zinc sulfate.

6. The process of claim 3 in which the flocculant is aluminum sulfate.

7. The process of claim 3 in which the flocculant is magnesium sulfate.

References Cited by the Examiner

UNITED STATES PATENTS

| | | | |
|---|---|---|---|
| 1,402,740 | 1/1922 | Codding | 209—5 X |
| 1,571,054 | 1/1926 | Hosenfeld | 209—5 |
| 1,774,510 | 9/1930 | Grossman | 209—5 |
| 2,442,429 | 6/1948 | Nye et al. | 23—18 X |
| 2,827,361 | 3/1958 | Lebedeff et al. | 23—140 |
| 2,955,932 | 10/1960 | Goren | 23—312 X |
| 3,095,270 | 6/1963 | Kocach et al. | |
| 3,119,661 | 1/1964 | Stambaugh et al. | 23—140 |

BENJAMIN HENKIN, *Primary Examiner.*

MAURICE A. BRINDISI, *Examiner.*

H. T. CARTER, *Assistant Examiner.*